US008115627B2

(12) United States Patent
Richter (10) Patent No.: US 8,115,627 B2
(45) Date of Patent: Feb. 14, 2012

(54) DETECTION DEVICE, PARTICULARLY FOR REALIZING A PROTECTION SYSTEM (75) Inventor: Wolfgang Richter, Germering (DE)

(73) Assignee: Ident Technology AG, Wessling (DE)

( * ) Notice: Subject to any disclaimer, the term of this patent is extended or adjusted under 35 U.S.C. 154(b) by 629 days.

(21) Appl. No.: 11/989,619

(22) PCT Filed: Jul. 27, 2006

(86) PCT No.: PCT/EP2006/007459
§ 371 (c)(1), (2), (4) Date: Dec. 23, 2008

(87) PCT Pub. No.: WO2007/012491
PCT Pub. Date: Feb. 1, 2007

(65) Prior Publication Data
US 2009/0109018 A1 Apr. 30, 2009

(30) Foreign Application Priority Data
Jul. 27, 2005 (DE) .......................... 10 2005 036 271

(51) Int. Cl.
*G08B 13/26* (2006.01)
(52) U.S. Cl. .................... 340/561; 340/636.1; 340/573.1
(58) Field of Classification Search .................. 340/561, 340/562, 564–567, 568.2–568.5, 573.1, 573.3, 340/573.4, 636.1, 636.12, 636.15, 636.19, 340/660, 664
See application file for complete search history.

(56) References Cited

U.S. PATENT DOCUMENTS

| | | | | |
|---|---|---|---|---|
| 3,697,972 A * | 10/1972 | Brown | ............................... | 43/59 |
| 4,155,193 A * | 5/1979 | MacDonald | ........................ | 43/67 |
| 4,159,590 A * | 7/1979 | Palfalvy | ............................. | 43/61 |
| 4,628,496 A * | 12/1986 | Lee | .................................. | 367/93 |
| 5,887,053 A * | 3/1999 | McGough | ....................... | 379/145 |
| 7,349,074 B2* | 3/2008 | Zambon | ........................ | 356/5.01 |
| 2003/0093951 A1* | 5/2003 | Ikeuchi | ............................. | 49/31 |

* cited by examiner

*Primary Examiner* — Daniel Previl
(74) *Attorney, Agent, or Firm* — Andrew Wilford (57) ABSTRACT

The invention relates to a detection device, particularly for realizing a protection system via which, for example, motor-driven injury-relevant systems can be operated in a controlled manner. The aim of the invention is to provide solutions via which advantages result with regard to the detection of injury-relevant situations, particularly the presence of limbs in danger-relevant areas. To this end, according to a first aspect of the invention, a detection system is provided, particularly for realizing a protection system via which, for example, motor-driven injury-relevant systems can be operated in a protected manner, comprising a receiving device for detecting the presence of an object, particularly of a living thing, in an observation area. This detection device comprises a detection element for recording a received event caused by the action of a modulated electrical field. This system is characterized by a launching device that has an emitting element for emitting the modulated electrical field, the receiving device and the transmitting device being configured in such a manner that, based on the transmission behavior of the observation area located, at least in sections, between the receiving element and the emitting element, the presence of the object, particularly the living thing, is detected in the observation area.

22 Claims, 11 Drawing Sheets

DETECTION DEVICE, PARTICULARLY FOR REALIZING A PROTECTION SYSTEM

CROSS REFERENCE TO RELATED APPLICATIONS

This application is the US national phase of PCT application PCT/EP2006/007459, filed 27 Jul. 2006, published 1 Feb. 2007 as WO 2007/012491, and claiming the priority of German patent application 102005036271.0 itself filed 27 Jul. 2005, whose entire disclosures are herewith incorporated by reference.

The invention relates to a detection system, in particular for the purpose of implementing a safety system, by way of which, for example, motor-driven, injury-prone systems may be operated in a controlled manner.

BACKGROUND OF THE INVENTION

In implementing systems that are provided with drives for ease of operation, the problem exists that the operating forces necessary for performing the sequence of movements, or even system inertia forces, are at a level that could cause injury. Especially in connection with the use of auxiliary drives for door, window, and canopy systems, it is possible for pinching or trapping to occur. The safety devices used up to now appear to be deficient.

OBJECT OF THE INVENTION

The object of the invention is to provide solutions by means of which advantages result with regard to the detection of injury-prone situations, in particular the presence of limbs in dangerous areas.

This object is attained according to a first aspect of the present invention by a detection system, in particular for implementing a safety system by means of which, for example, motor-driven and injury-prone systems may be operated in a safe manner, having a receiver for detecting the presence of an object, in particular a living thing, in an observation area, with the detection system including a detector for receiving a receiver event caused under the effect of a modulated electrical field, with this system having a coupler that itself has an emitter for emitting the modulated electrical field, with the receiver and the transmitter being configured in such a way that, on the basis of the transmission behavior of the observation area, which is located at least in sections between the receiver and the emitter, the presence of the object, in particular a living thing, in the observation area is detected.

Thus, it becomes possible in an advantageous fashion to detect the presence of an object, in particular a living thing, in the observation area with a high degree of signal clarity because the object functions as a signal transmission medium whose transmission properties considerably deviate from the transmission properties of the observation area in its undisturbed state.

The detector as well as the emitter may be a wire. This wire structure may be integrated into a seal.

It is possible in an advantageous fashion for the evaluation of the receiver event to be conducted in such a way that the distance of the object from the receiver may be calculated in at least an approximate fashion. Dependent upon the proportion of this evaluation, system control may be performed that can trigger a shut-off, a slowing, or an adjustment of the safety measures, for example, an increase of the shut-off sensitivity or reduction of the permitted power reference of a drive motor.

Here, the evaluation of the receiver event may be made so as to determine the longitudinal position of the object along the receiver. This becomes possible in particular by virtue of the fact that the receiver has a pronounced increase in resistance over its length. This may be achieved by the receiver being embodied in a partitioned fashion, with the individual sections being coupled by resistors. Depending on which section is closest to the object entering the observation area, a change in the frequency response of the circuit section including the receiver occurs to indicate this.

According to a particularly preferred embodiment of the invention, the receiver is included in a moving part in such a way that the observation area moves along with the moving part. As an alternative to or in combination with this measure, it is also possible for the emitter to be included in a moving part in such a way that the emission area moves along with the emitter of the coupling system. Systematic change to the receiver properties depending on the regulation process are preferably taken into account when evaluating the signals such that the changes in signal intensity and phase response caused merely by the regulation process are not erroneously evaluated as the presence of an object. The systematic changes to the transmission properties of the detection system caused by the regulation process may also be taken into account by influencing the transmission effect of the coupling system. Thus, under system conditions with relatively short distances between the receiver and emitters, it is possible to make observations with a lower field intensity while, in the case of system conditions in which the relevant observation area has larger dimensions, higher signal intensities are used.

It is possible for the wiring of the sensors and receivers to use a multiplex arrangement such that receiver events from different receivers or sections of receivers as well as a signal intrusion on the emitters subsequently occurs. In the case of this embodiment, it is possible for the evaluation to be performed by a combined consideration of each successive collected signal event. For example, the evaluation of the presence of a living thing may be made dependent upon multiple queries confirming certain results and/or signal events.

By evaluating the transmission behavior, it is possible to carry out function control in an advantageous fashion. It is possible here for properties of the signal coupled into the emitter to vary and to verify whether this variation is entering the receiver in a manner that is to be classified as correctly. This variation may take the form of a variation in intensity, in particular a variation of the frequency pattern.

It is possible to perform a system calibration by examining the transmission behavior. Thus, it is possible to compensate for certain outside influences that cause change, albeit merely slowly. This includes in particular influences such as general moisture, humidity, and dirt.

The detection system according to the invention is particularly suited for a door, in particular automatic sliding door or revolving doors. The detection system according to the invention is also particularly suitable for safeguarding the drive of convertible soft tops for motor vehicles. Here, the transmitter or receiver may be provided in the region of a closing edge, in particular integrated into a seal.

According to a further aspect of the present invention, the object mentioned above is also attained using a detection system for implementing a safety system by means of which, for example, motor-driven, injury-prone systems may be operated in a safe manner, having a receiver for detecting the presence of an object, in particular a living thing, in an observation area, with the detection system including a detector for receiving a receiver event caused under the effect of a modulated electrical field, a coupler that has an emitter for emitting the modulated electrical field, with the receiver and the transmitter being configured in such a way that, on the basis of the transmission behavior of the observation area, which is subdivided into sections between the receiver and the emitter, the presence of the object, in particular a living thing, in the observation area is detected, with the emitter being implemented using electrically conductive parts that project into the observation area or abut against it.

The electrically conductive parts may be parts of a motor vehicle, in particular doors, canopy or beam elements. These parts are preferably electrically separated from the actual grounded system. The receiver and the transmitter may be connected to ground. It is also possible for the receiver and the transmitter to be connected as counterelectrodes.

Especially for preventing pinching in the region of closing gaps, it is possible for the receiver or emitters to be elongated and thus to integrate them into seals.

Furthermore, the invention also creates a detection system, in particular for implementing a safety system by means of which, for example, motor-driven and injury-prone systems may be operated in a safe manner, having a receiver for detecting the presence of an object, in particular a living thing, in an observation area, with the detection system having a detector for receiving a receiver event caused under the effect of a modulated electrical field, characterized in that a first directional electrode is provided near the receiver that is integrated into the detection system in such a way that it may be charged with voltage in a coordinated manner and in that the orientation and/or the structure of the observation area provided for detecting the receiver event may be determined by the amount of voltage with which the directional electrode is charged.

In this manner, it becomes possible to make a focused observation in a particularly advantageous fashion, consulting the basic principle relating to the use of the interactive effects of electrical fields. In addition, it is preferable for a second directional electrode to be provided that extends near the first directional electrode and, in addition, by way of which it is possible to influence the shape and orientation of the field event or the potential observation area.

The voltage charge of the first and second directional electrodes may preferably be calibrated in such a way that the orientation of the observation area may be varied over an angular range of at least 30°. The angle variation may occur on the basis of changes to the hazard-prone system caused by the regulation process. For example, in the case of revolving doors, it is possible for an orientation toward a crushing-prone edge to first be brought about when the distance from this edge falls below a certain minimum amount.

According to a further aspect, the invention also creates a detection system, in particular for the implementation of a safety system, by way of which, for example, motor-driven, injury-prone systems may be operated in a safe manner, having:

a receiver for detecting the presence of an object, in particular a living thing, in an observation area, with the receiver including a receiver for receiving a receiver event caused under the effect of a modulated electrical field, a coupler that has an emitter for itself emitting the modulated electrical field, with the receiver and the transmitter being configured in such a way that, with reference to the transmission behavior of the observation area, at least sections of which are located between the receiver and the emitter, the presence of that object, in particular a living thing, in the observation area is detected, with a first directional electrode being provided near the emitter that is integrated into the detection system in such a way that it may be charged with voltage in a coordinated fashion and that the orientation and/or the shape of the main transmission area of the modulated electrical field may be established by means of the voltage charge.

Here as well, it is possible for a second directional electrode to be provided that extends near the first directional electrode and is used for the further configuration of the field transmission area.

The voltage charge of the first and second directional electrodes may occur in such a way that the orientation of the observation area is variable over an angular range of at least 30°

According to a further aspect, the invention also creates a detection system, in particular for the implementation of a safety system, by way of which, for example, motor-driven, injury-prone systems may be operated in a safe manner, having:

a receiver for detecting the presence of an object, in particular a living thing, in an observation area, with the detection system including a detector for receiving a receiver event caused under the effect of a modulated electrical field, characterized by a coupler that has an emitter for emitting the modulated electrical field, with the receiver and the transmitter being configured in such a way that, on the basis of the transmission behavior of the observation area, at least sections of which are located between the receiver and the emitter, the longitudinal position of the object along the emitter and/or along the receiver may be determined.

The receiver and/or emitter may be a resistive wire element. It is also possible for the receiver and/or emitter to be designed to be divided into zones of resistance.

The solution concepts according to the invention are suitable for overcoming the following disadvantageous features of safety systems that have been known up to now:

2.1 Emergency Shut-Off:

A person who is caught or is in danger of being caught cannot stop a revolving door by activating a corresponding switch, but rather is dependent upon the quick reactions of third parties. Another disadvantage of this solution lies in the designation or danger of confusion with the "emergency opening" switch for emergency exits.

2.2 Contact Strips:

A contact strip placed in danger zones contains a series of switches that react by closing or opening when subjected to pressure exceeding a certain level. In a normal case, the door wing of a revolving door swings past the contact strip at a distance of a few centimeters. If an object (person or thing) is located between the door and the frame (closing edge), it will be pressed against the slightly flexible contact strip by the force of the drive, which should result in the activation of the switch, which should result in the motor stopping the door. The primary disadvantage is the fact that the object is trapped, with a considerable (1500 N) force acting on it. Thin objects, such as dog leashes, walking sticks, or children's fingers, for example, are not certain to be detected. On occasion, an object has also hit the strip at an unfavorable angle and therefore did not activate the switch and thus the door did not stop and the object was trapped between the door and the frame and dragged along.

2.3 Pressure Tubing:

Tubes filled with a gas or a liquid have a pressure-sensitive sensor on at least one end. As is the case with 2.2, the object must first be trapped in order to activate the device; therefore, the same disadvantages apply that are listed under 2.2. In addition, this safety device may fail in an unnoticed fashion if the seal fails.

2.4 Photoelectric Relays:

A light source shines on a photoelectric cell located across from it that reports whether the beam of light is interrupted by an object. They operate only on small areas and in a straight line and are susceptible to reflections and soiling. Reflective photoelectric relays are therefore frequently set such that they operate from the top to approximately 20 cm from the floor so that they are not irritated by moisture or shiny objects (shoes). For this reason, a crawling small child or a person who has fallen will often go undetected and therefore suffer injury.

2.5 Radar:

The reflection of microwaves that strike moving objects is measured. In addition to the disadvantages such as those listed under 2.4, the disadvantages here include the wavelike transmission vectors and the very strong radiance, at least in the direct vicinity.

2.6 Overcurrent Detectors:

The principle of this solution lies in the fact that a drive that has been blocked by a trapped object uses far more power than when it is moving freely. This may be determined by means of a comparator that leads to the motor being switched off. Here as well, the disadvantage applies that, in order for the safety device to become active, an object must first become trapped.

2.7 Fiber Optic Cables:

Fiber optic cables are similar to photoelectric relays (2.4). They require additional lighting and operate in a faulty manner if soiled.

2.8 Camera:

A captured image is compared with a target state (holistically). If the differences between the images attain a certain value, this leads to a signal. Costly image processing systems and additional lighting (e.g. at night) are required for this purpose. The influence of outside light (for example, vehicle headlights) and contrast problems (for example, dark objects on a dark background or the glow from a cigarette) is a constant drawback.

2.9 Capacitive Proximity Switches:

These devices usually work only over small areas and thus have only a small detection range in addition to an installation height that is unsuitable for many cases.

In many cases, the conventional safety devices listed above are unable to provide adequate protection.

The solution concepts according to the invention allow a detection system to be implemented without compromising the appearance of the system to be secured with a low equipment expense.

The concept according to the invention is particularly suitable for implementing proximity detectors for protecting people and animals from injuries using flexibly movable closing edge seals with electronically controlled closers and cable-driven doors and gates.

In particular, the invention offers the following advantages:

On the one hand, the invention may be used to expand and improve the function of existing safety devices. Moreover, it may be integrated in a problem-free and discreet fashion into existing parts, for example, a door. For this purpose, an electrical conductor (wire, film, cord, conductive rubber/plastic, gel, etc.) is integrated into a seal, as is already used for closing edges. This has the advantage, among others, that it may be exchanged for a conventional seal, even retroactively. The closing edge is the neuralgic point with regard to trapping of objects; it is made secure in a particularly effective manner by the concept according to the invention.

An electronic circuit creates a capacitive alternating field on the electrical conductor that is able to detect the approach of conductive objects, such as human or animal body parts, over the entire length of the conductor/seal/closing edge.

BRIEF DESCRIPTION OF THE DRAWINGS

Additional details and features of the invention may be found in the description below with reference to the drawings, in which.

DETAILED DESCRIPTION

Figure 1:
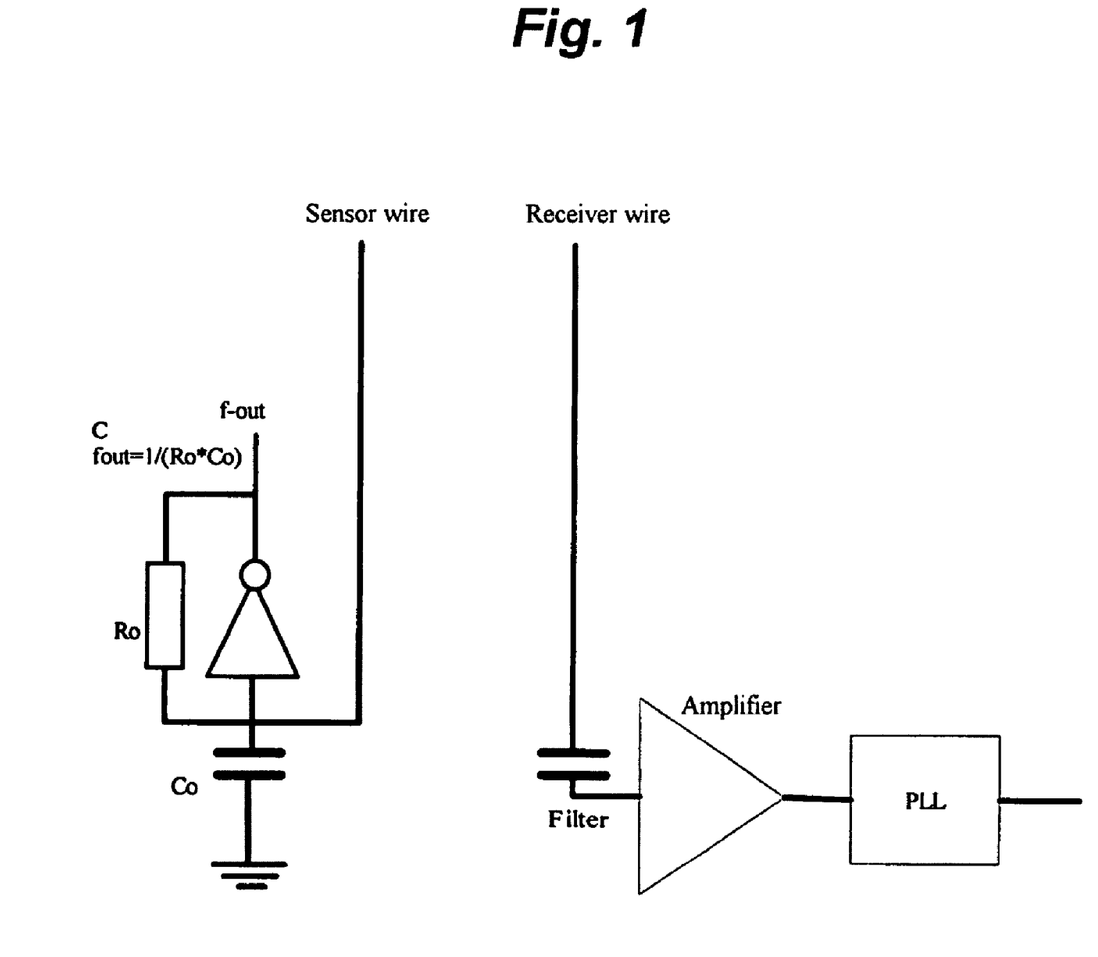
FIG. 1 is a schematic diagram showing a embodiment of a detection system according to the invention.

As may be seen from FIG. 1, the circuit according to the invention is not sensitive to either moisture or soiling when the sensor wire is imbedded in flexible sealing material. Depending on requirements, the sensor system operates either actively or passively. This means that the invention is able to recognize different areas of danger. A revolving door, for example, is only dangerous once the edge of a wing approaches the frame closely enough that the person entering the area could be trapped. A danger zone is created when, at a certain angle of inclusion, the alternating field of the passive sensor that, for example, is lodged in the one edge of the wing, is fed into a receiver that is located in the seal of the other facing edge of the frame and is thus activated. In this manner, the danger zone (impulse forces up to 1500 N) is doubly secured by a single field sensor.

On the one hand, this process proves that the passive sensor will function problem-free (permanent self-testing) and, on the other hand, that no electrically conductive object is located between the closing edges. If the wing passes the frame, it must further ensure that persons inside the revolving door do not come into contact with the wing, for example if they are using their hand to support themselves on the inside wall. In the same manner, the lower edge of the wing facing the floor must be provided with the same sensor so that it does not approach these persons or run over the fingers of a person who has fallen. Here, only the passive part of the sensor is operating to slow or stop the wing.

The detection range of the sensor extends in a lobar fashion approximately 20 cm into the sensor zone. This allows differentiation into a warning subzone, deceleration subzone, and a stopping subzone.

Figure 2:
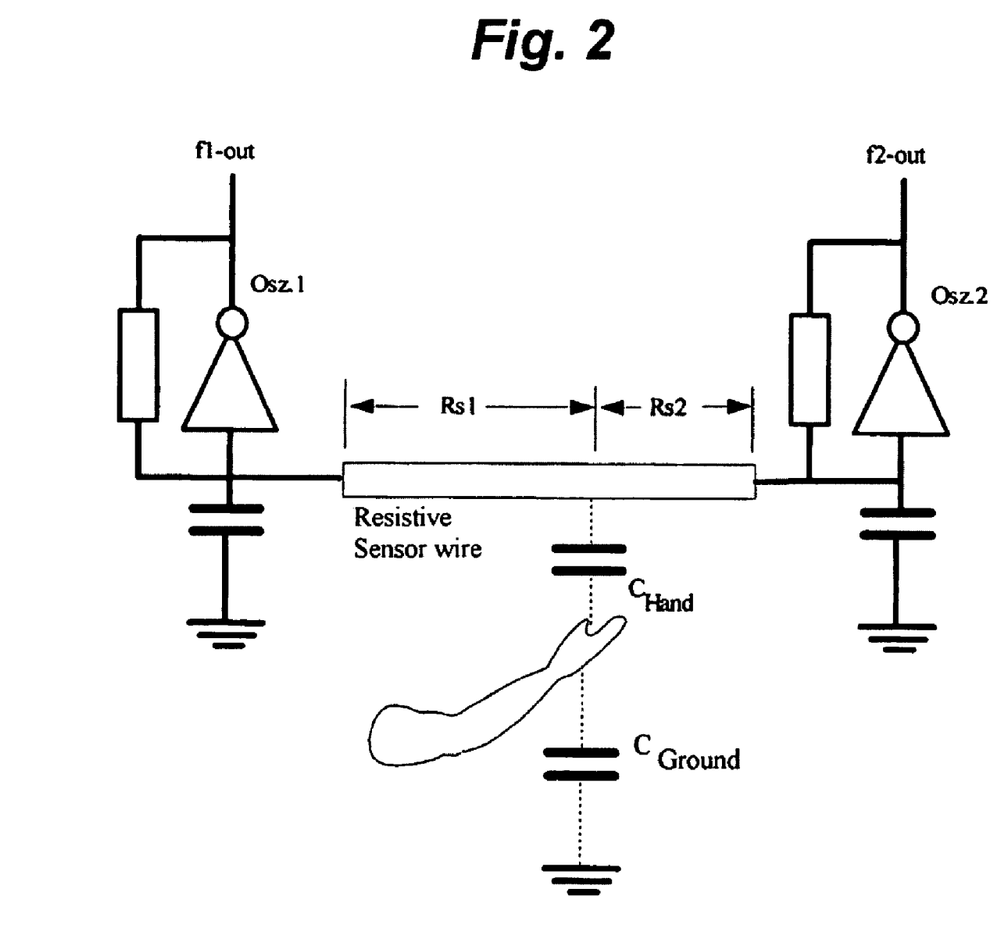
FIG. 2 a schematic diagram showing a second embodiment of a detection system according to the invention, using a highly resistive sensor wire for detecting the longitudinal position of a proximity event.

As can be seen in FIG. 2, it is particularly significant to risk analysis to determine in what situations the closing edges endanger objects. Therefore, the sensor calculates the precise position of an object entering its alternating field because of its setup according to the invention.

By virtue of its ability to communicate, it is possible to keep an electronic log book that can be evaluated to provide insight into the times and locations at which danger to objects occurs. Another distinctive feature of the invention is that the alternating field may be controlled in order to adapt it to the changing closing angle and in order to prevent false alarms.

Figure 3:
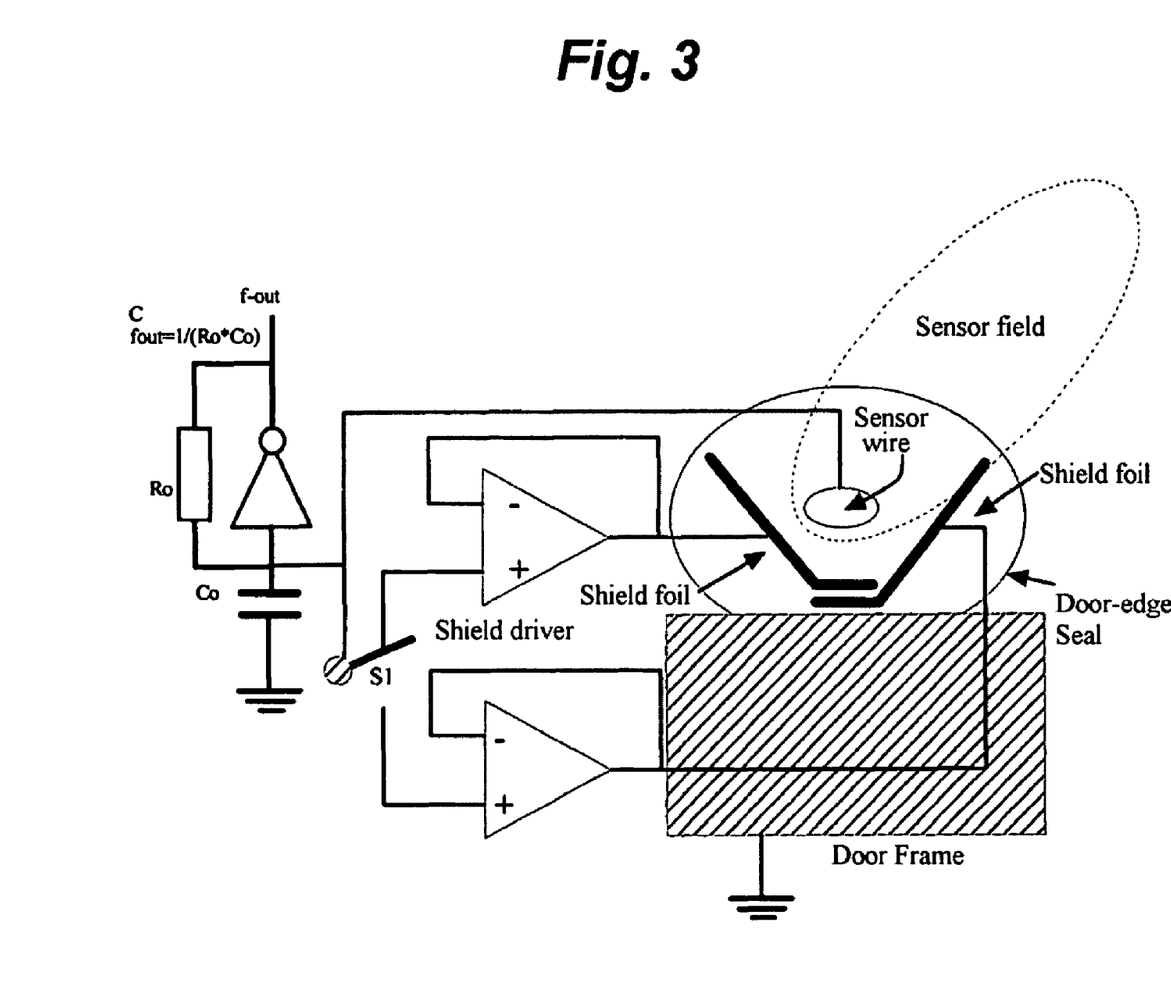
FIG. 3 is a schematic diagram showing a third embodiment of a directional electrode arrangement for establishing the orientation of a sensor field in a defined and variable manner, i.e., for detecting an entry signal in the observation area in question.

As may be seen in FIG. 3, direct contact between the sensor, for example, before a closing sequence is initiated, may be detected in a particularly advantageous manner on the basis of the concept according to the invention. Finally, the invention is suitable for providing existing contact strips with an additional safety measure working in a contact-free manner in that the contact strip is used as a sensor wire.

Illustrated Embodiment

Figure 4:
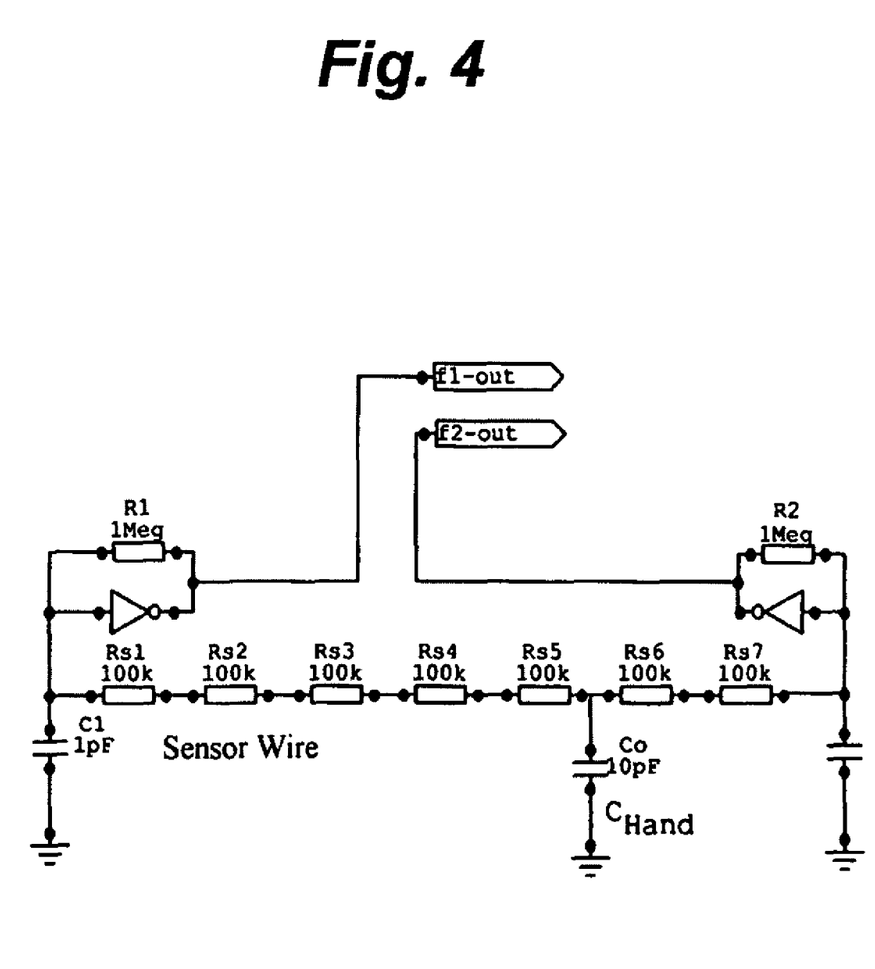
FIG. 4 is a circuit diagram showing a circuit corresponding in principle to the concept according to FIG. 2 where the resistive sensor wire is partitioned into individual sections between which are resistors whose resistance is considerably greater than the resistance of the respective wire sections.

As can be seen from FIG. 4, two RC oscillators are connected to a resistor wire by its frequency-defining condensers. This resistor wire is located in a closing edge seal as a sensor element. Both oscillators oscillate at the same frequency if no additional capacity is acting on the sensor wire.

The approach of an electrically conductive object, for example, a human hand ($C_{Hand}$) to a point x (for example, between Rs5 and Rs6) on the sensor wire causes both oscillators to modulate one another differently. This causes two frequencies F1 and F2 to result, from whose degree of differentiation it is possible to determine the position of the intruding object. By the additionally added change in capacity, the base frequencies of the oscillators drop as well. The degree of the reduction changes as the proximity of the object increases and reaches its highest value upon direct contact. If a receiver connected via another wire comes into the vicinity of the sensor wire located in the closing edge seal, it will read the frequency being emitted by the alternating field. A selective part located downstream (e.g. PLL XR2211, tone decoder NE 567, or the like) may show at an exit that precisely this frequency has been received.

Figure 5:
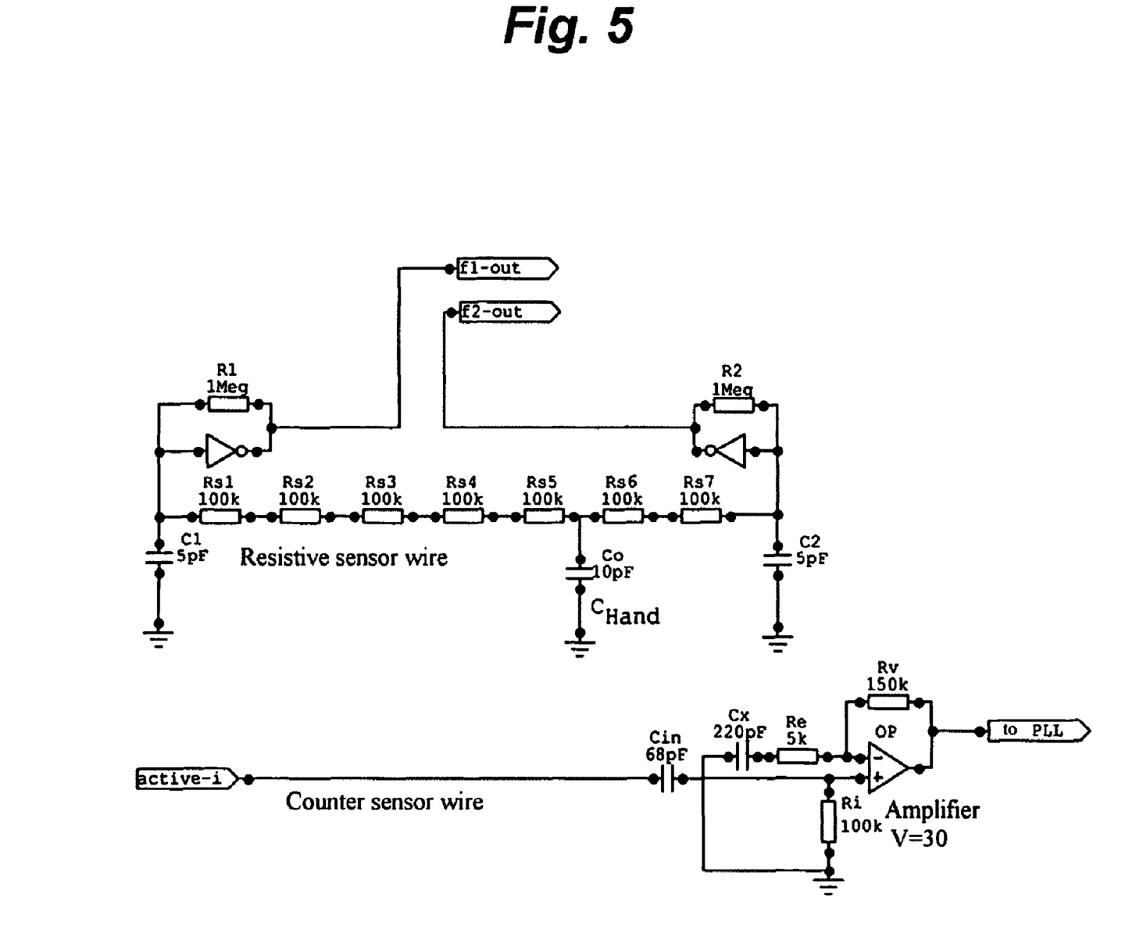
FIG. 5 is another circuit diagram, here using the approach according to FIG. 4 and the approach according to FIG. 1.
Figure 6:
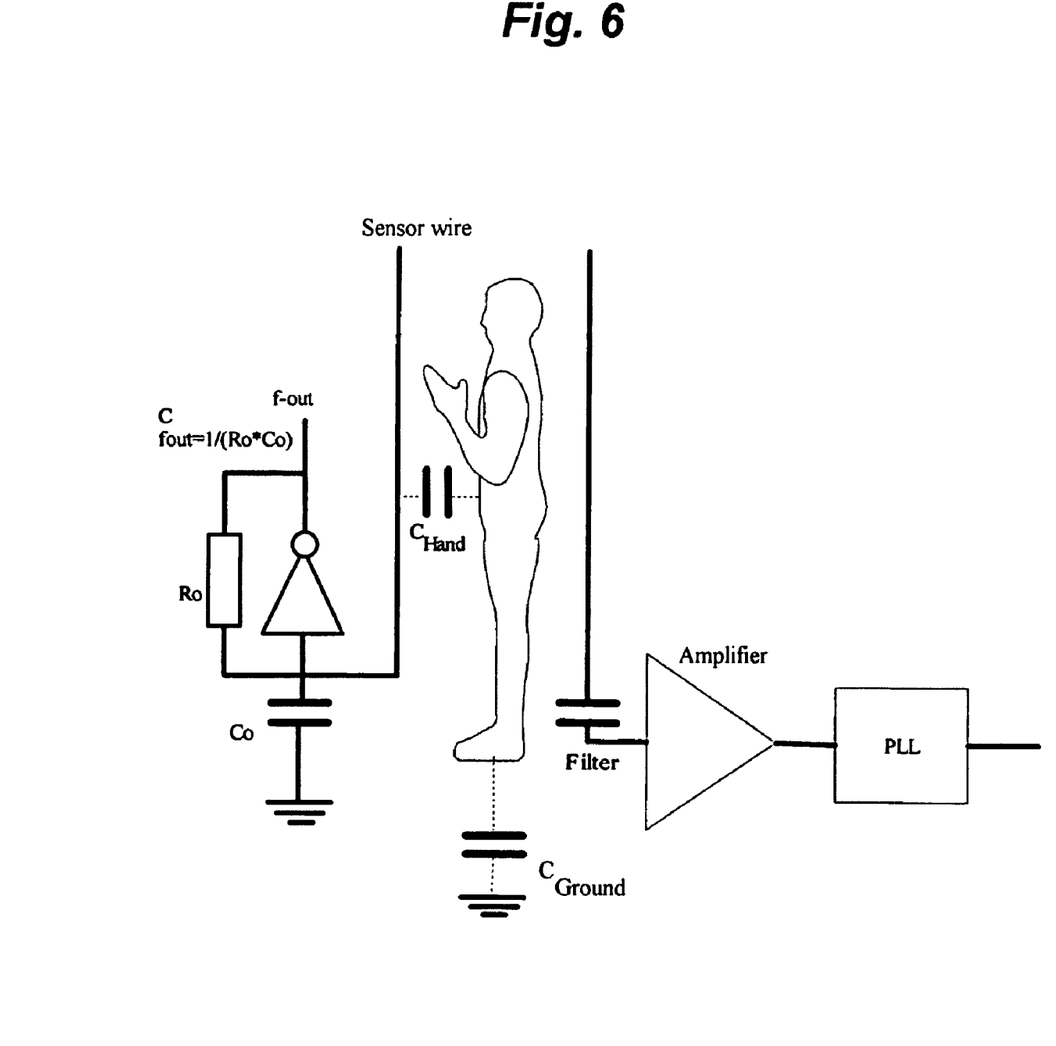
FIG. 6 is a schematic diagram showing the detection system according to the invention according to FIG. 1 in a "disrupted" state.

As can be seen from FIGS. 5 and 6, the verification of this supplied signal means that
  a) a process has ensued that is leading to the danger of trapping an object. The rotating wing of a door represents a danger for a person entering the area only at certain points in time. Cf. FIG. x.
  b) no electrically conductive and therefore frequency-changing object is located in the temporary danger zone.

In any other case, the presence of an electrically conductive object will lead to a change in frequency that a frequency-selective part is able to detect.

Further Embodiment

Figure 7:
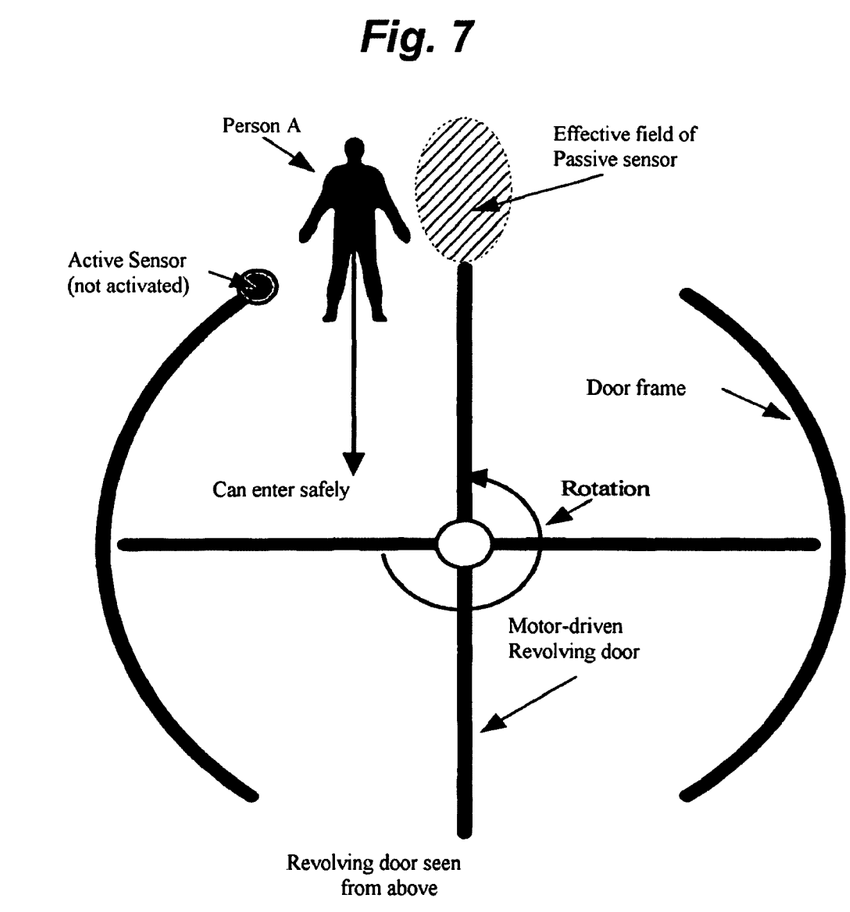
FIG. 7 is a schematic diagram showing a possibility for applying the concept according to the invention to achieve a safety function for a revolving door.

As may be seen from FIG. 7, a person A is entering a revolving door that is wide open by virtue of the position of its wings. Because the alternating field of the wing nearest to the person is not able to reach the active receiver in the door frame, a dangerous situation is not present at this moment.

Figure 8:
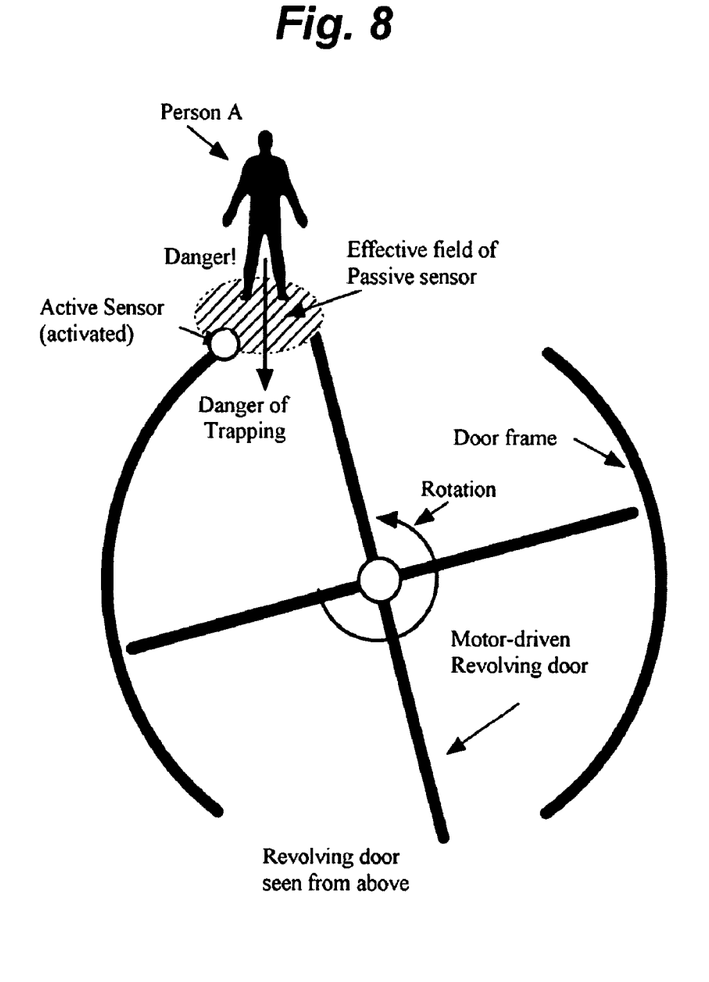
FIG. 8 is a schematic diagram to further show the concept according to the invention in a revolving door in a hazard-prone situation.

Because the wing continues to move, a situation may arise as is shown in FIG. 8.

If the person A still tried to move through the gap at this point in time, the active sensor would stop the drive motor before contact occurred between the wing and the person. If the wing passes the frame, its passive sensor comes into use as shown in FIG. 9.

Figure 9:
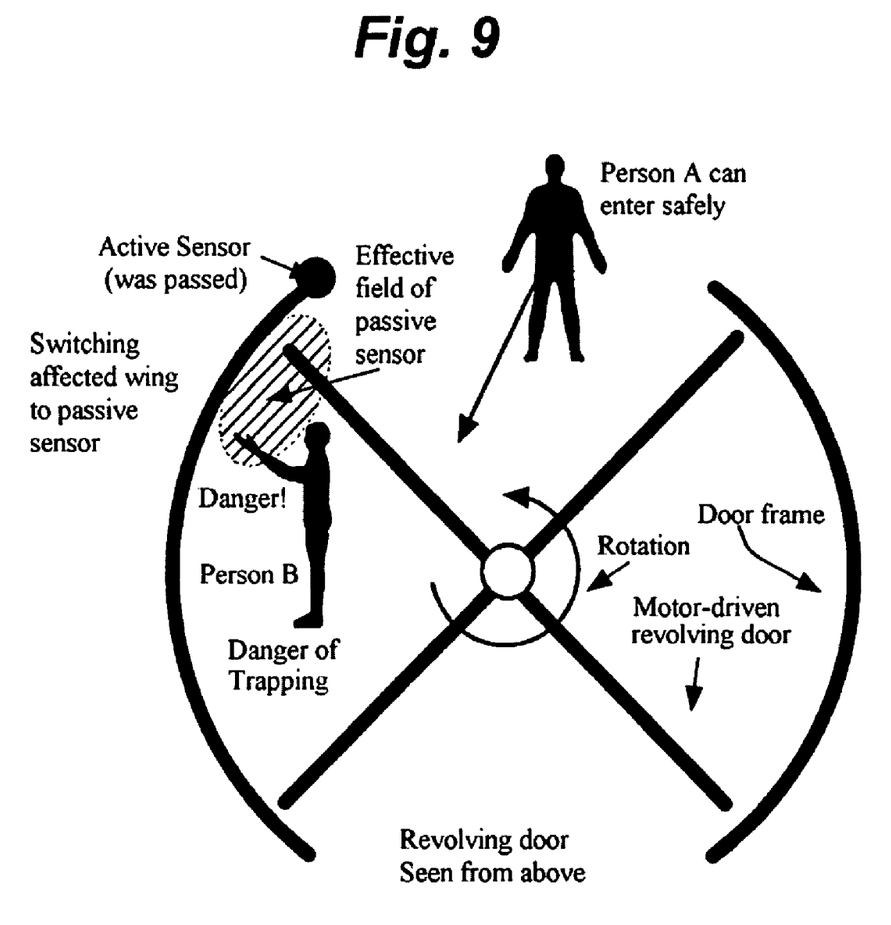
FIG. 9 is another schematic diagram similar to FIGS. 7 and 8 to further show the concept according to the invention in a revolving door in another hazard-prone situation.

According to FIG. 9, a person B passing through the door could be hit by an approaching rotating wing by supporting his or her hand on the wall. It would also be possible for the wing to move more quickly than the person is able to move. For this reason the sensor wire of the passive sensor is additionally also attached to the lower edge of the wing (foot area).

From the figures, it can be seen that the danger zones may dynamically change and person A has a safe path of entry while person B could become trapped.

Figure 10:
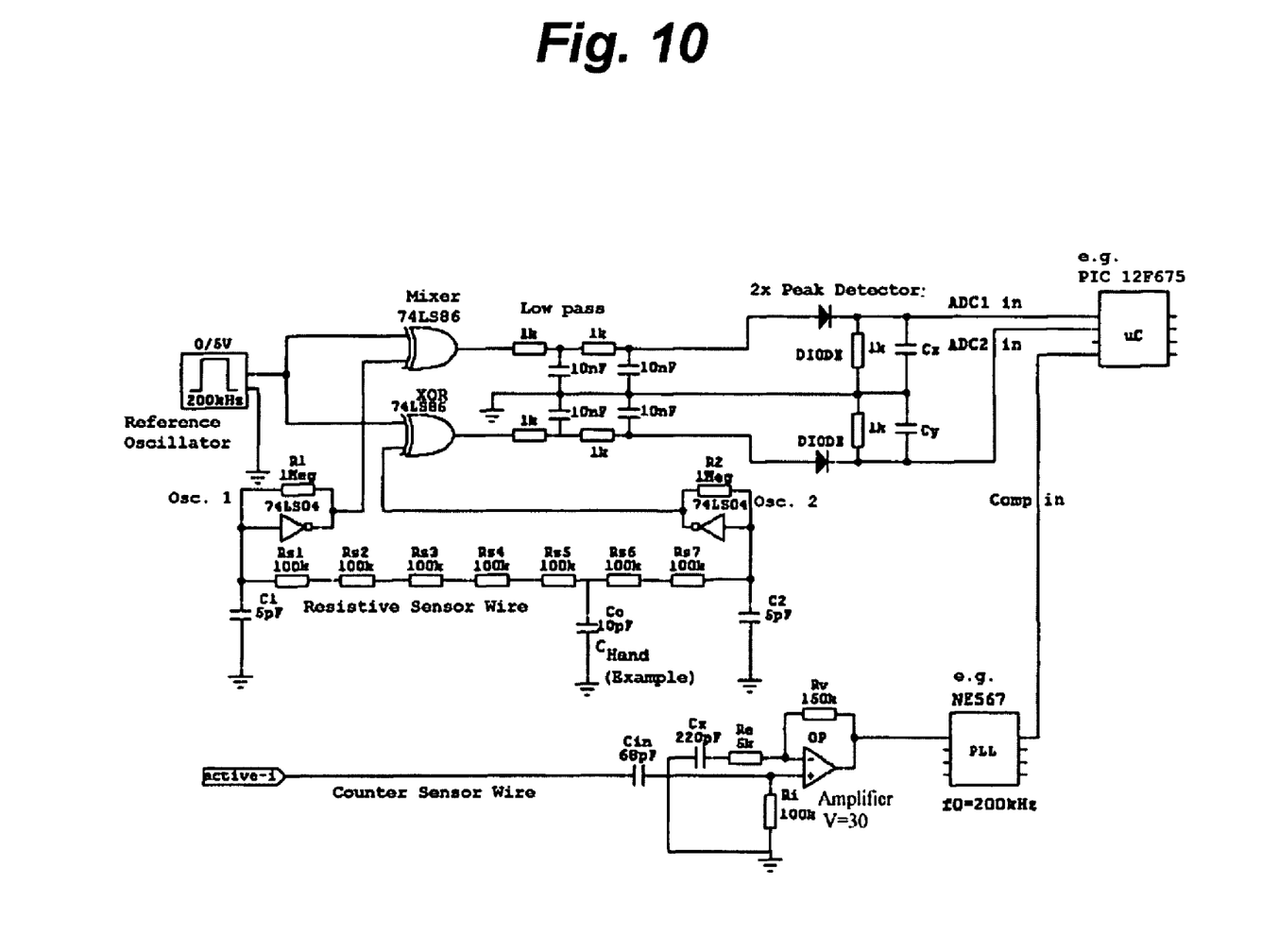
FIG. 10 is a circuit diagram for the system according to the invention.
Figure 11:
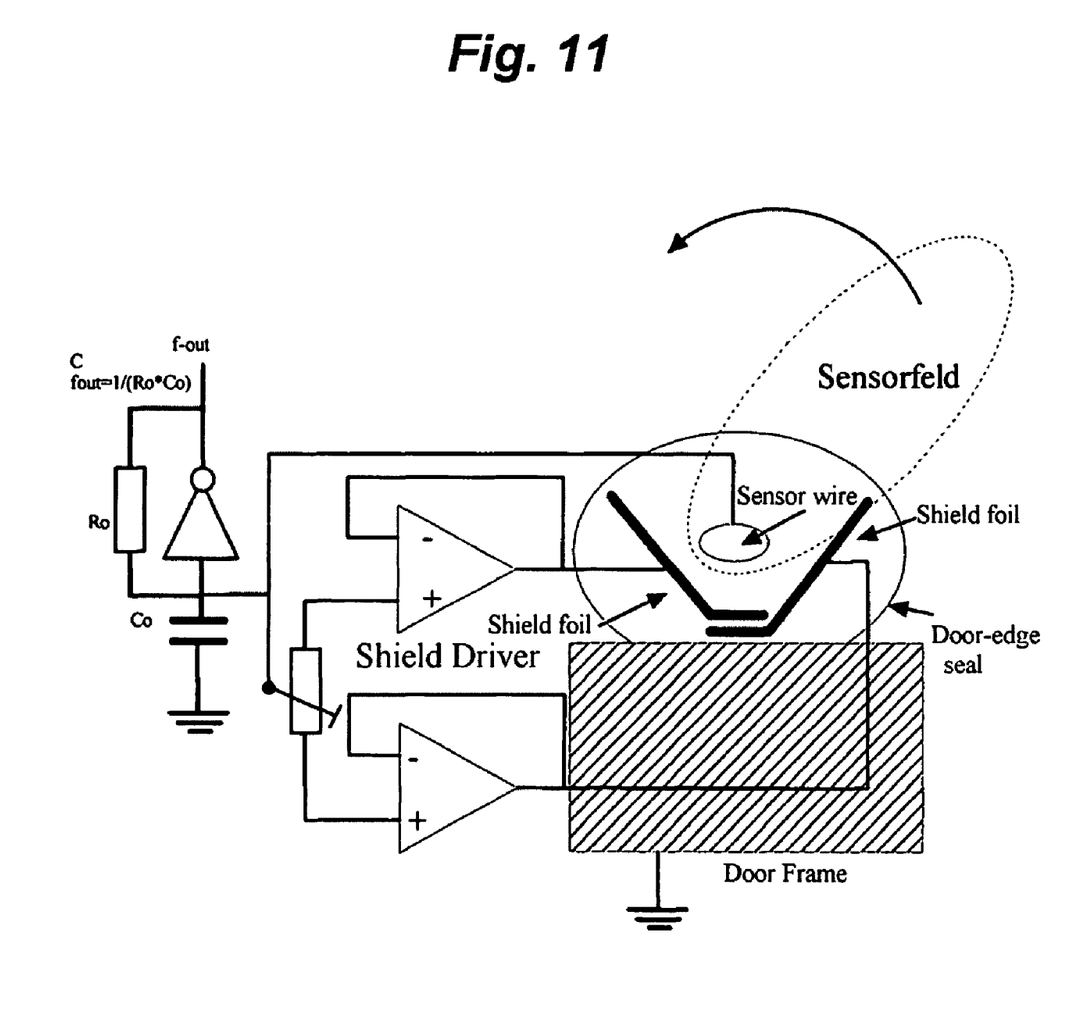
FIG. 11 is a schematic diagram of another system in accordance with the invention.

FIG. 10 shows another circuit arrangement according to the invention.

Circuit Description:

Two oscillators normally run at the same frequency. They are connected via an elongated resistive element. Upon the approach of an additional capacitance (body part) toward this material, the frequencies are reduced. Depending upon where the intruding object is located locally, an alternating voltage split results, whereby the oscillator near the intruding body part in question produces a frequency that is slightly elevated relative to the other (due to the resistance distributor ratio).

Grounds for the Reference Generator

The changes in frequency are initially minimal and must be clearly distinguished.

This occurs using a reference oscillator having a fixed frequency that is the same between the two oscillators (Osc. 1, Osc. 2) if they are oscillating undisturbed by foreign bodies. A low-pass filter connected downstream of the conversion transducer shows a sensor event as f(1)=|f(reference)−f(Osc. 1)| and f(2)=|f(reference)−f(Osc. 2)|. An invading body part increases f(1)+f(2) dependent upon the distance. The position of the intrusion may be determined using f(1)−f(2).

Alternative field control by changing the shield conditions (detection lobe). Or by the use of (suctioning) metallic structures as a sensor element. Preferably aimed at the danger zone.

Advantageous Mounting

Metal elements (door or window frames, jambs, machine elements) are usable as well.

Other possible applications of the detection system according to the invention are anti-theft systems, for example, in combination with or integrated into bicycle stands.

Use of connecting blocks by charging with sensor electronics

1. Position of the hand/body part may be determined by resistive sensor material.

2. Detection of temporarily (possibly cyclically) occurring danger zones.

3. Controllable "shield or detection lobe."
4. Insulated metal parts usable as the sensor element.

| Characteristics of the electronic elements | | |
|---|---|---|
| Sensor Types | Disadvantage | Advantage of the Invention |
| Seals with contact strips | Mechanical adjustment/ rigid, must have contact with person | No mechanism, Flexible and contact-free |
| Hydraulic/ pneumatic pressure tubes | Seals, must have contact with persons | No mechanism, Flexible and contact-free |
| Photoelectric relays | Work only in small areas and in a straight line, errors caused by reflections | Free form factor |
| Radar | Active microwaves Fan-shaped distribution | No high frequency |
| Capacitive proximity circuits | fan-shaped sensor field | Uncomplicated installation, works over its entire length |
| Overcurrent detectors | Must have contact with a person | Early detection allows time for motors to shut down |
| Fiber optic cables | Require illumination, errors caused by fouling | Insensitive to soiling |
| Camera | Expensive image processing equipment, additional illumination | Simple, cost-effective principle |

The invention claimed is:

1. A detection system for controlling a motor-driven element, the system comprising:
   an elongated emitter extending along an edge of an observation zone adjacent the moving part;
   a pair of transmitter oscillators connected to opposite ends of the emitter and each applying to a respective end of the emitter a respective modulated signal so as to form a modulated electrical field defining an observation area, the signals being of the same frequency;
   a detector juxtaposed with the zone for sensing the field and producing an output when the field is disrupted by a object entering or being present in the zone; and
   evaluating means connected to the detector and to a motor driving the moving part for determining a position of the object entering or present in the field from a change of a frequency of the field and for slowing or stopping driving of the moving part by the motor when a likelihood of contact between the object and moving part exists.

2. The detection system according to claim 1 wherein and the detector is a wire.

3. The detection system according to claim 1 wherein the emitter is a wire.

4. The detection system according to claim 1 wherein determination of the position of the object is carried out so as to determine the distance of the object from the detector.

5. The detection system according to claim 1 wherein the determination of the position of the object is carried out so as to determine the longitudinal position of the object along the detector.

6. The detection system according to claim 1 wherein the detector is integrated into the moving part in such a way that the observation area travels along with the moving part.

7. The detection system according to claim 1 wherein the emitter is integrated into the moving part in such a way that the electrical field travels along with the emitter.

8. The detection system according to claim 1 wherein systematic changes to the receiving properties caused by the regulation process are taken into account.

9. The detection system according to claim 1 wherein systematic changes to the transmission properties of the detection system caused by the evaluation process are taken into account by influencing the transmission behavior of the coupling system.

10. The detection system according to claim 1 wherein a system calibration is conducted taking into account transmission behavior.

11. The detection system according to claim 1 wherein the detector is integrated into a door.

12. The detection system according to claim 1 wherein the detector is integrated in a convertible soft top for a motor vehicle.

13. The detection system according to claim 1 wherein the transmission or receiver is provided in a closing edge area.

14. The detection system according to claim 1 wherein the emitter is part of a motor vehicle.

15. The detection system according to claim 1 wherein the transmitter oscillators and detector are connected to a common ground.

16. The detection system according to claim 1 wherein the transmitter oscillators and detector are connected as counter-electrodes.

17. The detection system according to claim 1 wherein the emitter and detector are longitudinally elongated.

18. The detection system according to claim 1 wherein the emitter and detector are integrated into seals.

19. The detection system according to claim 1 wherein the modulated signals applied to the ends of the emitter are calibrated in such a way that the orientation of the observation area may be varied over an angular range of at least 30°.

20. The detection system according to claim 1, further comprising
   a second emitter that extends near the first-mentioned emitter.

21. The detection system according to claim 1 wherein the detector or emitter is a resistive wire element.

22. The detection system according to claim 21 wherein the detector or emitter is be divided into zones of resistance.

* * * * *